Nov. 30, 1965     R. L. ROD     3,220,258
SENSING THE PRESENCE OR ABSENCE OF MATERIAL
Original Filed May 18, 1956
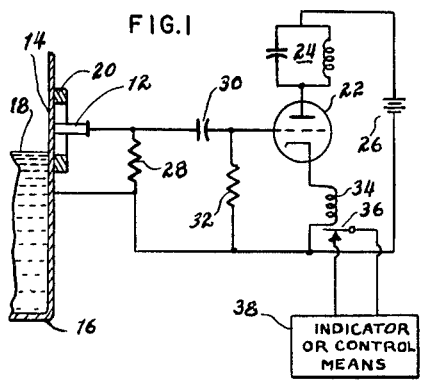
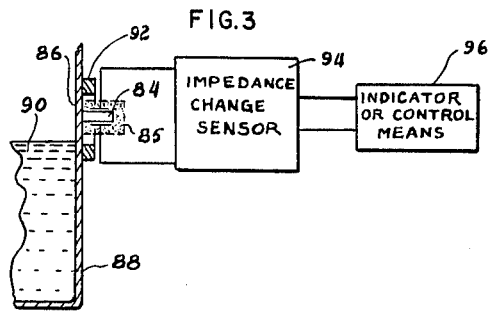
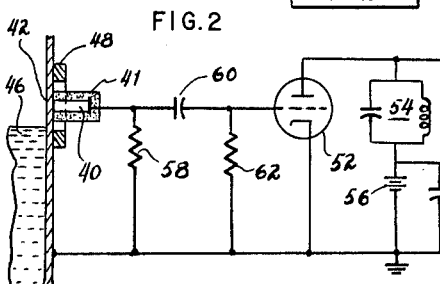
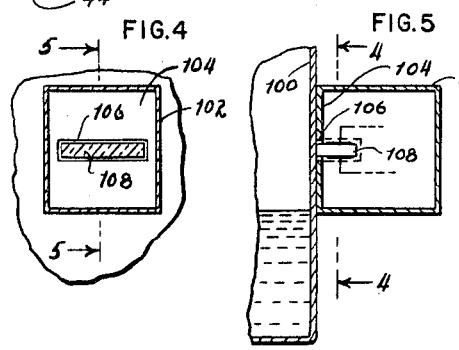
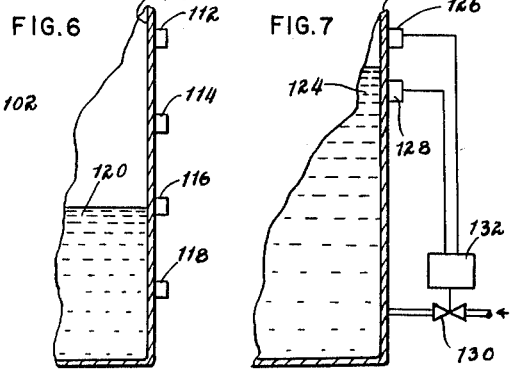
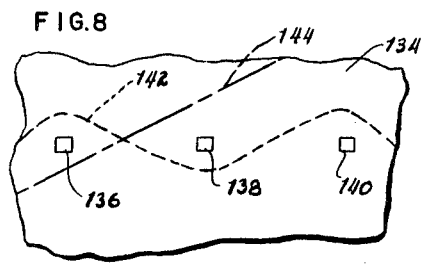
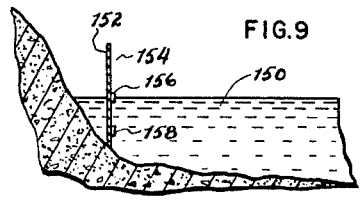
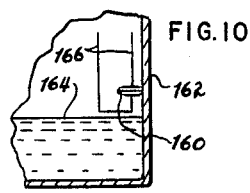
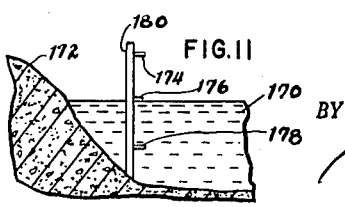
INVENTOR.
ROBERT L. ROD
BY
ATTORNEYS United States Patent Office 3,220,258
Patented Nov. 30, 1965

3,220,258
SENSING THE PRESENCE OR ABSENCE
OF MATERIAL
Robert Louis Rod, Pacific Palisades, Calif., assignor to
Acoustica Associates, Inc., Glenwood Landing, Long
Island, N.Y., a corporation of New York
Original application May 18, 1956, Ser. No. 585,889, now
Patent No. 2,990,543, dated June 27, 1961. Divided
and this application Feb. 8, 1961, Ser. No. 87,963
19 Claims. (Cl. 73—290)

This invention relates to the sensing of the presence or absence of material, especially material resting against a wall, and more particularly to the sensing of the level of stored material in a container, and is a division of my copending application Serial No. 585,889, now Patent No. 2,990,543 filed on May 18, 1956. The stored material most commonly is a liquid, but may be a solid, particularly when made fluid as when in powdered or granular form.

The primary object of the invention is to provide a method and apparatus for the above-stated purpose. A more specific object in one form of the invention is to operate wholly outside the container, without requiring any connection or device inside the container. This is done by setting up a vibration of the wall by means of an electroacoustic transducer, and sensing the difference in impedance or/and frequency of the transducer assembly resulting from the presence or absence of material against the wall.

A further object is to improve the accuracy of the response obtained. Still another object is to establish an optimum relation between the frequency of vibration and the thickness and material of the wall. Other objects are to apply the aforesaid system to measurement of level, to maintenance of level, and to the detection of sloshing or tilting.

To accomplish the foregoing general objects, and other more specific objects which will hereinafter appear, my invention resides in the apparatus elements, and their relation one to another, as are hereinafter more particularly described in the following specification. The specification is accompanied by drawings, in which:

FIG. 1 schematically represents one form of apparatus embodying features of my invention;

FIG. 2 discloses a modification;

FIG. 3 schematically represents still another modification;

FIG. 4 is a section through a housing, taken approximately in the plane of the line 4—4 of FIG. 5;

FIG. 5 is another section through the housing, taken approximately in the plane of the line 5—5 of FIG. 4;

FIG. 6 is explanatory of apparatus used for level measurement;

FIG. 7 is explanatory of apparatus used for level maintenance;

FIG. 8 is explanatory of apparatus used to detect sloshing or tilting;

FIG. 9 shows how the invention may be used to measure liquid level in an open reservoir, lake, or river, etc.;

FIG. 10 is explanatory of a modified way to use an electroacoustic transducer; and FIG. 11 shows the application of the same to an open body of material.

In one form the system may be termed an "ultrasonic knucklerapper," which raps on the wall of a tank to determine the presence or absence of a liquid or solid on the other side. The device operates on acoustic principles as follows:

An electroacoustic transducer, preferably, but not limited to, a piezoelectric device in the form of a small bar with thin rectangular cross-section, is attached with one surface cemented or otherwise secured to the outer surface of the tank or container wall. A small rectangular area of the tank wall surrounding the crystal preferably is outlined by a relatively heavy rectangular reinforcing frame, so that the vibrations of the wall set up by the transducer are confined to this area. The area of the wall so outlined vibrates like a drumhead in synchronism with the electroacoustic transducer. Vibrations are produced by coupling the electroacoustic transducer to a suitable source of high frequency alternating current.

If such a vibrating sensing element is located above the level of liquid or solid material in the tank, it is a high-Q (low damping) resonant system. The only possible losses of power in vibrating are very small. They are dynamic losses in the electroacoustic transducer and in the tank wall section which is vibrating as a drumhead, and the insignificant acoustic radiation losses to the air or vapor above the surface within the tank. However, if the material covers the position of the sensing element on the tank wall, the acoustic radiation losses are very much larger. This results from the marked difference in the ability of a mechanical vibrator to radiate power into a liquid (or solid) and into a vapor. Therefore, when the sensing element is covered by a liquid or solid material, the system becomes a low-Q resonant system.

The detection of this change in the Q-factor can be accomplished by several means, the most convenient of which is to use the transducer as the resonant element in a standard crystal oscillator. The transducer is connected across the grid circuit of an oscillator tube (or equivalent transistor emitter), and oscillations take place at a frequency determined by the resonant frequency of the system. However, the anode current (both A.C. and D.C.) is very sensitive to the losses in the transducer, which appear in the equivalent electrical circuit as a damping resistor in the grid circuit. Therefore, the change between conditions with and without material covering the drumhead area causes a marked change in the anode current, which can be detected by any of a number of different conventional means, some of which are next referred to.

Referring to FIG. 1 of the drawing, the apparatus comprising an electroacoustic transducer 12 mounted on the wall 14 of a tank 16 containing liquid 18. A part of the wall is framed, as indicated at 20. The transducer is vibrated by an oscillator which, in the present case, comprises a vacuum tube 22, tank circuit 24, "B" battery 26, and an input circuit including a coupling resistor 28, a coupling capacitor 30 and a bias resistor 32. The apparatus further comprises means to sense the difference in impedance or/and frequency of the transducer assembly resulting from the presence or absence of liquid 18 against the framed wall portion 14. By transducer assembly, I mean the transducer 12 with its connected wall area 14. In the present case the anode current flows through a sensitive relay 34 having a movable contact 36 controlling an indicator or/and control means 38, which may be located remotely. One may think of the transducer as an impedance which becomes low and heavily damps the oscillator circuit, or one may think of the transducer as changing natural frequency and so differing from the resonant frequency of the tank circuit 24. In any case there results an abrupt change in anode current, and relay 34 is responsive to that change.

Another means for sensing the presence or absence of a liquid or solid in the drumhead region is to measure the shift in oscillator frequency which occurs if the various parameters in the resonant system are properly selected.

This is illustrated in FIG. 2 of the drawing, in which transducer 40 is secured to the framed portion 42 of the wall of a tank 44 containing liquid 46. The wall portion 42 is framed at 48. As before, the surfaces of transducer 40 other than that secured to wall 42 are dynamically free, but preferably they are secured against static and low frequency inertial loads by the use of "pressure-release" supporting materials such as rubber, neoprene or "corprene," in the manner commonly used in electroacoustic transducer design. This is indicated at 41.

The transducer forms a part of the input circuit of an oscillator similar to that previously described, in comprising a tube 52, a tank circuit 54, "B" battery 56, a coupling resistor 58, a coupling capacitor 60, and a grid bias resistor 62. The tank circuit is coupled to a frequency discriminator circuit which may be conventional, and which in the present case, comprises diodes 64 and 66, symmetrically coupled to tank circuit 54 by means of a divided coupling coil or transformer secondary 68, which may be tuned by a capacitor 70. The output is taken across resistors 72 and 74, shunted by capacitors 76 and 78. There is an additional coupling capacitor 80 between tank circuit 54 and the discriminator circuit.

Because of the phase relationships between the primary and each half of the secondary 68, each half of the secondary being connected in series with the primary through the capacitor 80, the voltages applied to the diodes 64 and 66 becomes unequal as the signal or input swings away from the resonant frequency in either direction. As the swing occurs, the voltages developed across the diode load resistors 72 and 74 connected in series similarly change. The output voltage depends on the difference in amplitude of the voltages developed across resistors 72 and 74. These voltages are equal and of opposite sign when the oscillator frequency is unchanged, and the output therefore may be balanced to zero, for either the absence or the presence of liquid at the wall portion 42. Then in the opposite situation there is a distinct unbalance, producing an output which may be used to operate an indicator or control means 82.

Another sensing method is to measure the difference in the coupled electromechanical impedance of the transducer. This is schematically illustrated in FIG. 3 of the drawing, in which the electroacoustic transducer 84 is secured to a portion 86 of a tank wall 88 carrying a liquid 90. The wall portion 86 may be framed, as indicated at 92. In this case the electrodes of the transducer are on opposite free surfaces, instead of using the tank wall as one of the electrodes. The transducer again may be embedded in "pressure-release" supporting material 85.

The transducer 84 is connected to an impedance change sensor 94, and this in turn is connected to a suitable indicator or control means 96, which may be located remotely from the transducer. The impedance change sensor housed in rectangle 94 may be a conventional impedance bridge, or any other known form of impedance measuring or impedance responsive device.

While a piezoelectric transducer has been mentioned as the preferred electroacoustic transducer, ferroceramic, magnetostriction, electrostatic, and electrodynamic transducers may also be used alternatively.

For operating convenience it is preferable to select a vibration frequency which is suitably related to the tank wall thickness and the velocity of sound through the tank wall. For optimum results, the wall thickness at the operating or resonance frequency of the system should be one half-wavelength in thickness, or a multiple of one half-wavelength. The "loading" effects on the transducer then are most pronounced.

By suitably designing or modifying the circuitry or relays, the response of the system to a rise in level to the drumhead area can be made either rapid or slow, as need be, the slow response being useful when it is desired to average out sloshing conditions.

From a mechanical standpoint, the device can be made entirely self-contained within a small box or case affixed to the outside of the tank wall. A flange along the base perimeter of the case may be used as the stiffener frame previously referred to as confining the vibrations to a relatively small area in order to improve the definition or accuracy of the system.

This is illustrated in FIGS. 4 and 5 of the drawing, showing how tank wall 100 may have a housing 102 secured thereto. This is an enclosed housing, one wall 104 of which is horizontally slotted at 106. The slotted wall 104 acts as a means to frame the area defined within the slot 106, and to this exposed or "windowed" area the transducer 108 is secured. The housing 102 may contain the circuitry, and where exceeding compactness or miniaturization is required, a transistor may be used in lieu of a vacuum tube.

Some methods of using the invention may be described with reference to FIGS. 6 through 9 of the drawing. In FIG. 6 a series of units are spaced one above the other on a tank wall 110, as is indicated at 112, 114, 116 and 118. These units may be like that described in connection with FIGS. 4 and 5 each including a transducer and oscillator. Conductors (not shown) lead from the units to a suitable indicator system, which may be located remotely, and by examining the indicators one can determine the height of liquid 120 in tank 110, in a series of steps defined by the spacing of the units.

Referring now to FIG. 7, in this case a tank 122 is to be kept filled with liquid 124 at a predetermined level. A pair of units 126 and 128 are disposed above and below the desired level, and are connected by suitable conductors to a supply valve 130 controlled by a suitable valve control means 132. The arrangement is such that when the liquid level is below unit 128 liquid is admitted until the level reaches the unit 126, whereupon the supply is stopped.

A single unit may be used at the desired level, this serving to shut off the supply when liquid is present, and to resume supply when liquid is not present. If a substanial change in level can be tolerated, the arrangement shown in FIG. 7 has the advantage that the valve will operate at longer intervals.

In FIG. 8 the tank wall 134 is provided with a plurality of units 136, 138 and 140 disposed in horizontal relation. Such units may be used to detect sloshing or agitation of liquid in a tank, this being indicated by the broken line 142. It will be evident that some units will have liquid present and others not. In the present case there is liquid present at units 136 and 140, and not at unit 138. A moment later the situation may be reversed. Thus, the sloshing may be shown at any suitable indicator or alarm device, which may be remote from the tank.

A similar array of horizontally disposed units may be used to detect a change in horizontality of a tank. Thus, if the liquid surface is disposed at an angle, as is indicated by the dot and dash line 144, there will be liquid present at some units and not at others, in a quiescent or steady state, and this may be used as an indication that the tank has been tilted, and may be differentiated from the active wave condition shown at 142.

So far as it is described the measurement has referred to liquid confined in a tank, and the wall has been the tank wall. However, this is not essential. For example, referring to FIG. 9 I show an open body of water 150 such as a lake, reservoir or river. A plate 152 is immersed in the liquid, and carries a series of units 154, 156 and 158. The loading of liquid against the plate 152 will produce a change in impedance or/and frequency, as previously described, except that here there is liquid on both sides of the plate 152.

It is not essential, even when dealing with material in a tank, that the transducer be disposed outside the tank, although the ability to work wholly outside the tank is one of the important advantages of the present improvement. As an obvious example, the plate 152 in FIG. 9 may be put inside the tank. Referring to FIG. 10, I there show a transducer 160 mounted directly on the inside of a wall 162 of a tank containing liquid 164. Conductors 166 lead to electrodes on the transducer, and the surface of the device may be coated with a film of suitable insulating material to protect it against the liquid 164. When the transducer is surrounded by liquid its vibration is damped.

In this particular form of the invention the response may be made relatively independent of vibration of the tank wall. For that purpose a transducer which vibrates by bending (that is, in cantilever) is preferable. A commercial example is the "Bimorph" made by the Brush Development Corporation of Cleveland, Ohio. It is made of two slabs cemented together and having dissimilar expansion characteristic, thus causing bending. The bending vibration is damped by the surrounding material 164 when the level rises. In this case wall 162 may be quite thick and rigid.

Referring now to FIG. 11, the height of liquid 170 in an outdoor reservoir, lake, or river, etc. 172, may be measured by a series of transducers 174, 176, 178 mounted for bending or cantilever vibration. They may be mounted on a rigid post 180, and no vibratile plate or wall is required. Similarly, a post may be used in the tank of FIG. 10, for example, at the center of the tank.

When vibrating a tank wall, the accuracy is lower with a thicker wall. Also a lower frequency should be used with a thicker wall and a higher frequency with a thinner wall. However, it is not well to define frequency solely with reference to thickness, because another factor is the material of which the wall is made. It is for this reason that I prefer to speak in terms of wavelength, and the wall thickness is to be a half-wavelength (or a multiple of one half-wavelength) for the velocity of propagation may vary with the material. A relation based on wavelength inherently allows for differences of material.

When the liquid or solid substance reaches the transducer it loads it, and changes the natural frequency of the assembly, as already described. The frequency is lower when loaded and higher when not, provided that the wall thickness is a half-wavelength (or multiple thereof).

In one example of the invention the wall thickness is less than a fiftieth of an inch, and the frequency is in the order of megacycles. By using a transistor instead of a vacuum tube, the entire circuit shown in FIG. 1, including the battery cell, may be housed within a cube as one inch on edge. The window for the crystal may be ⅛" high (for accuracy) and 1" wide, and to stiffen the tank wall around the window, the face of the cube may itself be used, it being flanged downward from above and upward from below, as already described. The crystal may be disposed edgewise to best fit the horizontally elongated window.

It is believed that the construction, theory, and operation of my improvement, as well as the advantages thereof, will be apparent from the foregoing detailed description. It will be understood that while I have referred often to liquid level, the material may be solid instead of liquid, particularly when in granular form so that it is fluid.

It will be understood that the end electrode connection of FIGS. 1 and 2 may be used in FIGS. 3 and 5 in lieu of the side electrode connection there shown, and that, conversely, the side electrode connection of FIG. 3 and 5 may be used in lieu of the end connection shown in FIGS. 1 and 2. The pressure-release material shown in FIGS. 2 and 3 may be used in FIGS. 1, 4, and 5, although not there shown, and, conversely, the pressure-release material shown in FIGS. 2 and 3 may be omitted if desired. The housing shown in FIGS. 4 and 5 which acts also as a frame may be used in FIGS. 1, 2 and 3 in lieu of the separate frame there shown. The immersed diaphragm arrangement of FIG. 9 may be used in a storage tank, and similarly the immersed post support of FIG. 11 may be used in a storage tank, these forms of the invention not being limited to outdoor or natural bodies of liquid.

It therefore will be apparent that while I have shown and described my invention in several preferred forms, changes may be made in the structures shown, without departing from the scope of the invention, as sought to be defined in the following claims. In the claims the term "electroacoustic transducer" is intended to be generic to devices which change electrical to mechanical energy, and vice versa, at sonic and ultrasonic vibration frequencies. It is intended to include piezoelectric, ferroceramic, magnetostriction, electrostatic, and electrodynamic transducers. In the claims the expression "free to vibrate" is not meant to exclude the use of "pressure-release" supporting materials, mentioned above. The term "fluid" means "flowable" and includes powdered and granular material as well as liquids.

What is claimed is:

1. Apparatus for sensing the level of a body of fluid material with respect to a container thereof, which comprises an electromechanical transducer mounted at a predetermined level relative to said container, said transducer having a first natural frequency of mechanical self-resonance, for a given mode of mechanical vibration and being provided with a vibrations path in solid material which is an integral number of half waves long at said frequency, a substantially uninterrupted gaseous path for vibrations propagating between said transducer and the surface of said fluid when said fluid is below said predetermined level, said gaseous path reducing to zero when said fluid is present at said level, an electronic oscillator circuit including said transducer as the frequency determining element thereof, electrical conductors extending between said oscillator circuit and said transducer for coupling said transducer into said circuit and setting said transducer into mechanical vibration at said natural frequency, said transducer having a first value of its Q-factor when it is in contact with said fluid material and its mechanical vibration is damped thereby and a second value of its Q-factor higher than said first value when it is out of contact with said fluid material, and operator means in said oscillator circuit having one of two mutually exclusive states depending on which of said Q-factor values is presented to said oscillator circuit via said conductors whereby the loading condition of said transducer as sensed by said oscillator circuit via said conductors determines the states of said operator means.

2. Apparatus according to claim 1 in which said transducer is mounted on a wall of said container, said mechanical vibrations being propagated through said wall, the thickness of said wall being an integral number of half waves of said vibrations at said frequency.

3. Apparatus for sensing the presence of a fluid material against a wall, which comprises an electromechanical transducer mounted on said wall, circuitry including electrical conductors leading to said transducer for setting said transducer into vibration at a desired frequency, and additional means connected to said same conductors and circuitry to sense the difference in an operating characteristic of the said transducer assembly resulting from the presence of said fluid material against the wall as compared with said characteristic when said material is not present against said wall, the said frequency being so related to the thickness of the wall that the latter is one or more half wavelengths of vibrations therein at said frequency.

4. Apparatus for sensing the level of a body of fluid material with respect to a container thereof, which comprises an electromechanical transducer mounted at a predetermined level in a position to be immersed in the body of fluid when the fluid reaches said level, said transducer having a first natural frequency of self-resonance for a given mode of mechanical vibration and being provided with a vibrations path in solid material which is an integral number of half waves long at said frequency, a substantially uninterrupted gaseous path for vibrations propagating between said transducer and the surface of said fluid when said fluid is below said predetermined level, said gaseous path reducing to zero when said fluid is present at said level, an electronic oscillator circuit including said transducer as the frequency determining element thereof, electrical conductors extending between said oscillator circuit and said transducer for coupling said transducer into said circuit and setting said transducer into mechanical vibration at said natural frequency, said transducer having a first value of its Q-factor when it is in contact with said fluid material and its mechanical vibration is damped thereby and a second value of its Q-factor higher than said first value when it is out of contact with said fluid material, and operator means in said oscillator circuit having one of two mutually exclusive states depending on which of said Q-factors values is presented to said oscillator circuit via said conductors, whereby the loading condition of said transducer as sensed by said oscillator circuit via said conductors determines the state of said operator means.

5. Apparatus for sensing the level of stored liquid material in a container, comprising an electromechanical transducer having a first natural frequency of mechanical self-resonance when immersed in a gaseous environment, means disposing said body at a predetermined level in said container, there being a substantially uninterrupted gaseous path for vibrations propagating between said transducer and the surface of said liquid when said liquid is below said predetermined level, said gaseous path reducing to zero when said liquid is present at said level, electrical conductors leading to said transducer and coupled thereto for interchanging electrical and elastic wave energy therewith, an electronic oscillator circuit, said conductors connecting said transducer into said circuit as a frequency determining element therefor, said circuit being adapted to oscillate at a frequency related to said first natural frequency and thereby to cause mechanical vibration of said transducer at said first natural frequency when immersed in a gaseous environment, and an operator in said oscillator circuit adapted to assume a first of two mutually exclusive states when said circuit is in a first condition and the second of said states when said circuit is in a second condition, said circuit being adapted to be in said first condition when said transducer is in contact with and its mechanical vibration is damped by said fluid, said circuit being adapted to be in said second condition when said transducer is surrounded by a gaseous material having a substantially lower damping effect on mechanical vibration thereof.

6. Apparatus for sensing the level of stored liquid material in a container, which comprises a piezoelectric transducer mounted at a predetermined level relative to said container, there being a substantially uninterrupted gaseous path for vibrations propagating between said transducer and the surface of said liquid when said liquid is below said predetermined level, said gaseous path reducing to zero when said liquid is present at said level, said transducer having a first natural frequency of self-resonance for a given mode of mechanical vibration, an electronic oscillator circuit including said transducer as the frequency determining element thereof, electrical conductors extending between said oscillator circuit and electrodes on said transducer for coupling said transducer into said circuit and setting said transducer into mechanical vibration at said natural frequency, said transducer having a first value of its Q-factor when it is in contact with said liquid material and its mechanical vibration is damped thereby and a second value of its Q-factor higher than said first value when it is out of contact with said liquid material, and operator means in said oscillator circuit having one of two mutually exclusive states depending on which of said Q-factor values is presented to said oscillator circuit via said conductors, whereby the loading condition of said transducer as sensed by said oscillator circuit via said conductors determines the state of said operator means.

7. Apparatus for sensing the level of a body of fluid material with respect to a container thereof, which comprises an electromechanical transducer mounted at a predetermined level relative to said container, there being a substantially uninterrupted gaseous path for vibrations propagating between said transducer and the surface of said fluid when said fluid is below said predetermined level, said gaseous path reducing to zero when said fluid is present at said level, said transducer having a first natural frequency of mechanical self-resonance, for a given mode of mechanical vibration and being provided with a vibrations path in solid material which is an integral number of half waves long at said frequency, an electronic oscillator circuit including said transducer as the frequency determining element thereof, said circuit having a portion tuned to electrical resonance at said frequency, electrical conductors extending between said oscillator circuit and said transducer for coupling said transducer into said circuit and setting said transducer into mechanical vibration at said natural frequency, said transducer having a first value of its Q-factor when it is in contact with said fluid material and its mechanical vibration is damped thereby and a second value of its Q-factor higher than said first value when it is out of contact with said fluid material, and operator means in said oscillator circuit in series with said tuned portion and having one of two mutually exclusive states depending on which of said Q-factor values is presented to said oscillator circuit via said conductors, whereby the loading condition of said transducer as sensed by said oscillator circuit via said conductors determines the state of said operator means.

8. Apparatus for sensing the level of a body of fluid material with respect to a container thereof, which comprises a plurality of electromechanical transducer means each mounted at the same predetermined level relative to said container but in a separate and distinct location at said level, means coupled to each transducer to sense the difference in an operating characteristic thereof resulting from the presence of said fluid material in acoustical contact therewith as compared with said characteristic when said fluid material is not so present, and means including said transducer for detecting sloshing of said fluid material in said container.

9. Apparatus for detecting the presence or absence of a body of liquid at a location between upper and lower limits of level and for indicating the level of the body of liquid within said limits, comprising a solid body comprising a conductor of ultrasonic energy formed with a face adapted to extend between said upper and said lower limit of level to define the said location and to enter into liquid contacting relationship with the body of liquid when present at the said location, signal transmitter means mounted on the body and including a transducer adapted to be energized by means including an electric oscillator to propagate ultrasonic energy into the body towards said surface between said limits of level, signal receiving means adapted to be influenced by ultrasonic energy reflected back from said surface through said solid body to said signal receiving means and adapted to assume a condition of magnitude proportional to the intensity of said ultrasonic energy influencing the signal receiving means, and means adapted to effect a signal in dependence on the magnitude of the condition of the signal receiving means.

10. An apparatus as claimed in claim 9, wherein the said transducer forms part of the signal receiving means.

11. Apparatus as claimed in claim 10, wherein the transducer includes a body having piezo-electric qualities and a specific inductive capacity which varies with intensity of ultrasonic energy reflected back to the transducer and the change in specific inductive capacity as the level of the body of liquid varies between said upper and lower limits is adapted by varying the value of capacity in the oscillator circuit to determine the amplitude of oscillation therein.

12. Apparatus for detecting the presence or absence of a body of liquid in relation to a solid body at a location contiguous with a surface of the solid body extending between upper and lower limits of level and for indicating the level of the body of liquid within said limits, comprising signal transmitting means including piezo-electric transducer mounted on the solid body and having a specific inductive capacity variable by impressing ultrasonic vibration thereon, an electric oscillator, the transducer being arranged to be energized by said electric oscillator for the propagation of ultrasonic energy into the solid body towards said surface between said upper and lower limits of level, the electric oscillator having a tuned circuit with a capacitance including said transducer adapted to control amplitude of oscillation of the circuit, signal receiving means connected with said circuit, responsive to electrical condition of the transducer and adapted to assume one condition with the body of liquid at the said location and consequent small reflection of ultrasonic vibrations from said surface to said transducer and another condition with the body of liquid absent from said location and consequent large reflection of ultrasonic vibrations from said surface to said transducer and intermediate conditions when the level of the body of liquid is intermediate the upper and lower limits of level and consequent intermediate amounts of ultrasonic vibrations are reflected back from said surface to the transducer, and means comprising a current sensitive device adapted to effect a signal in dependence on the amplitude of oscillation in the oscillation in the oscillator circuit.

13. Apparatus for detecting the presence or absence of a body of liquid at a location between upper and lower limits of level and adjacent the inner face of a side wall of a container for the body of liquid and for indicating the level of the body of liquid between said upper and lower limits, comprising transmitter means mounted on the outer face of the wall of the container opposite the said location and including a transducer adapted to be energized by means including an electric oscillator to propagate ultrasonic energy into the wall of the container towards the location and between said limits of level, and signal receiving means arranged to be influenced by ultrasonic energy reflected back from the inner face of the wall of the container and adapted to establish one condition when the level of the body of liquid is above the said location, another condition when the body of liquid is absent from the location and intermediate conditions when the level of the body of liquid is intermediate the said upper and lower limits of level, and means including a current sensitive device adapted to effect a signal in dependence on the magnitude of the condition of the signal receiving means.

14. Apparatus as claimed in claim 13, wherein the transducer and the electric oscillator are adapted to form part of the signal receiving means and the transducer is arranged to be influenced by ultrasonic energy reflected back from the inner face of the wall adapted to establish one condition in the oscillator circuit when the body of liquid is absent from the said location, to establish another condition when the level of the body of liquid is above the location, and intermediate conditions when the level of the body of liquid is intermediate the said upper and lower limits of level.

15. Apparatus as claimed in claim 14, wherein means are provided adapted to control the level of the body of liquid in dependence on the magnitude of the said condition and thereby determine the level of the body of liquid between said upper and lower limits.

16. Apparatus as claimed in claim 14, wherein the transducer includes a body having piezo-electric qualities and a specific inductive capacity which varies with changes in ultrasonic energy reflected back to the transducer and has different values in dependence on the level of the body of liquid between said upper and lower limits of level, and change in specific inductive capacity between said values is adapted by varying the values of capacity in the oscillator circuit to determine the amplitude of oscillation in the oscillator circuit.

17. Apparatus for detecting the presence or absence of a body of liquid at a location between upper and lower limits of level and for indicating the level of the body of liquid within said limits, comprising solid body means including elastic wave energy conductor means positioned at said upper and said lower limit of level for defining said location and for entering into liquid contacting relationship with the body of liquid when present at said location, signal transmitter means coupled to said solid body means and including transducer means adapted to be energized by means including an electric oscillator for propagating elastic wave energy into conductor means, means for determining damping of said energy due to the presence of said liquid at said conductor means and adapted to assume a condition of magnitude proportional to the amount of said damping, and means for effecting a signal in dependence upon said magnitude of said condition.

18. Apparatus for detecting the presence or absence of a body of liquid in relation to solid body means at a location contiguous with a surface of said solid body means having portions at least at upper and lower limits of level and for indicating the level of the body of liquid within said limits, comprising signal transmitting means including piezo-electric transducer means mounted on said solid body means, an electric oscillator, said transducer means being arranged to be energised by said electric oscillator for the propagation of elastic wave energy into said solid body means, said electric oscillator having a tuned circuit including said transducer means, means connected with said circuit responsive to an electrical condition of said transducer means and adapted to assume at least one condition with said body of liquid adjacent said lower limit and another condition with said body of liquid adjacent said upper limit, and means comprising a current sensitive device for effecting a signal in dependence on the amplitude of oscillation in said oscillator circuit.

19. Apparatus for detecting the presence or absence of a body of liquid at a location between upper and lower limits of level, comprising transmitter means including transducer means adapted to be energized by means including an electric oscillator for propagating elastic wave energy into said transmitter means at least at said limits of level, and means responsive to changes in the amplitude of said energy due to liquid adjacent said transmitter means and adapted to establish at least one condition when the level of said body of liquid is above said upper limit and at least another condition when the level of said body of liquid is below said lower limit, and means for effecting a signal corresponding to any of said conditions.

References Cited by the Examiner

UNITED STATES PATENTS

| 2,484,623 | 10/1949 | Heising | 73—67.7 |
| 2,808,581 | 10/1957 | Findlay | 340—244 |
| 3,019,650 | 2/1962 | Worswick | 73—290 |

FOREIGN PATENTS

| 582,760 | 8/1933 | Germany. |

ISAAC LISANN, *Primary Examiner.*

ROBERT L. EVANS, *Examiner.*